US009971671B2

(12) United States Patent
Inamdar et al.

(10) Patent No.: US 9,971,671 B2
(45) Date of Patent: May 15, 2018

(54) SYSTEM AND METHOD FOR DYNAMIC DEBUGGING IN A MULTITENANT APPLICATION SERVER ENVIRONMENT

(71) Applicant: Oracle International Corporation, Redwood Shores, CA (US)

(72) Inventors: Rajendra Inamdar, North Chelmsford, MA (US); Anthony Vlatas, Brookline, NH (US); Michael Cico, Hampton, NH (US); Sandeep Shrivastava, Westford, MA (US)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 0 days. days.

(21) Appl. No.: 14/860,348

(22) Filed: Sep. 21, 2015

(65) Prior Publication Data

US 2016/0092342 A1 Mar. 31, 2016

Related U.S. Application Data

(60) Provisional application No. 62/055,855, filed on Sep. 26, 2014.

(51) Int. Cl.
*G06F 9/445* (2006.01)
*G06F 11/36* (2006.01)

(52) U.S. Cl.
CPC ................................ *G06F 11/3648* (2013.01)

(58) Field of Classification Search
None
See application file for complete search history.

(56) References Cited

U.S. PATENT DOCUMENTS

2005/0273667 A1* 12/2005 Shrivastava ........ G06F 11/0709 714/47.2
2009/0300093 A1* 12/2009 Griffiths ................ G06F 9/5055 709/202
2010/0176962 A1* 7/2010 Yossef ................ H04L 12/2602 340/815.45
2016/0092197 A1 3/2016 Kuchibhotla

* cited by examiner

*Primary Examiner* — Chuck Kendall
(74) *Attorney, Agent, or Firm* — Tucker Ellis LLP

(57) ABSTRACT

In accordance with an embodiment, described herein is a system and method for dynamic debugging in an application server environment. An exemplary method can provide, at one or more computers, including an application server environment executing thereon, a plurality of deployable resources which can be used within the application server environment, one or more running managed servers, the one or more managed servers being within a domain, and a debug framework, the debug framework comprising a debug patch directory, the debug patch directory containing one or more debug patches. The method can activate a selected debug patch within the domain, the selected debug patch comprising at least one class, the selected debug patch designed to gather information about the problem within the domain. The managed servers, upon activation of the selected debug patch, can remain running. The method can also deactivate the selected debug patch without requiring a restart.

20 Claims, 10 Drawing Sheets

SYSTEM AND METHOD FOR DYNAMIC DEBUGGING IN A MULTITENANT APPLICATION SERVER ENVIRONMENT

CLAIM OF PRIORITY AND CROSS-REFERENCE TO RELATED APPLICATIONS

This application claims the benefit of priority to U.S. Provisional Application titled "SYSTEM AND METHOD FOR DYNAMIC DEBUG PATCHING IN A MULTI-TENANT APPLICATION SERVER ENVIRONMENT", Application No. 62/055,855, filed Sep. 26, 2014; and is related to U.S. Patent Application titled "SYSTEM AND METHOD FOR SUPPORTING MULTITENANCY IN AN APPLICATION SERVER, CLOUD, OR OTHER ENVIRONMENT", application Ser. No. 14/601,883, filed Jan. 21, 2015; each of which above applications are herein incorporated by reference.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyrights rights whatsoever.

FIELD OF INVENTION

Embodiments of the invention are generally related to application servers and cloud environments, and are particularly related to a system and method for interceptors in a multitenant application server environment.

BACKGROUND

Application servers generally provide a managed environment within which software applications can be deployed and run. Cloud-based environments allow applications to run within and take advantage of the distributed resources provided by a cloud. Such environments can support large numbers of users or tenants, some of which may have specific requirements that are particular to that user or tenant.

SUMMARY

In accordance with an embodiment, described herein is a system and method for dynamic debugging in an application server environment. An exemplary method can provide, at one or more computers, including an application server environment executing thereon, a plurality of deployable resources which can be used within the application server environment, one or more running managed servers, the one or more managed servers being within a domain, and a debug framework, the debug framework comprising a debug patch directory, the debug patch directory containing one or more debug patches. The method can activate a selected debug patch within the domain, the selected debug patch comprising at least one class, the selected debug patch designed to gather information about the problem within the domain. The managed servers, upon activation of the selected debug patch, can remain running. The method can also deactivate the selected debug patch without requiring a restart.

DETAILED DESCRIPTION

In accordance with an embodiment, described herein is a system and method for dynamic debugging in an application server environment. An exemplary method can provide, at one or more computers, including an application server environment executing thereon, a plurality of deployable resources which can be used within the application server environment, one or more running managed servers, the one or more managed servers being within a domain, and a debug framework, the debug framework comprising a debug patch directory, the debug patch directory containing one or more debug patches. The method can activate a selected debug patch within the domain, the selected debug patch comprising at least one class, the selected debug patch designed to gather information about the problem within the domain. The managed servers, upon activation of the selected debug patch, can remain running. The method can also deactivate the selected debug patch without requiring a restart.

Application Server (e.g., Multi-Tenant, MT) Environment

Figure 1:
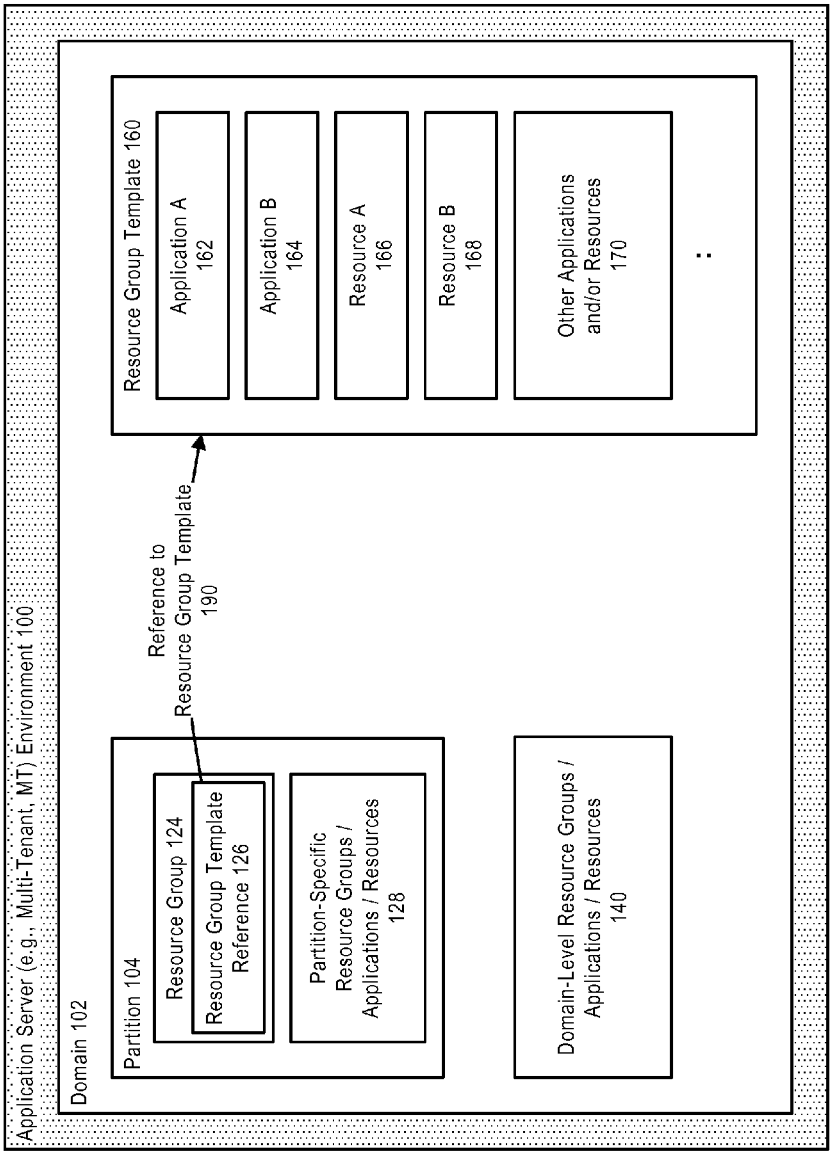
FIG. 1 illustrates a system for supporting multi-tenancy in an application server, cloud, or other environment, in accordance with an embodiment.

FIG. 1 illustrates a system for supporting multi-tenancy in an application server, cloud, or other environment, in accordance with an embodiment.

As illustrated in FIG. 1, in accordance with an embodiment, an application server (e.g., multi-tenant, MT) environment 100, or other computing environment which enables the deployment and execution of software applications, can be configured to include and operate according to a domain 102 configuration that is used at runtime to define an application server domain.

In accordance with an embodiment, the application server can include one or more partitions 104 that are defined for use at runtime. Each partition can be associated with a globally unique partition identifier (ID) and partition configuration, and can further include one or more resource groups 124, together with a reference to a resource group template 126 and/or partition-specific applications or resources 128. Domain-level resource groups, applications and/or resources 140 can also be defined at the domain level, optionally with a reference to a resource group template.

Each resource group template 160 can define one or more applications A 162, B 164, resources A 166, B 168, and/or other deployable applications or resources 170, and can be referenced by a resource group. For example, as illustrated in FIG. 1, resource group 124 in partition 104 can reference 190 resource group template 160.

Generally, a system administrator can define partitions, domain-level resource groups and resource group templates, and security realms; while a partition administrator can define aspects of their own partition, for example, by creating partition-level resource groups, deploying applications to the partition, or referencing specific realms for the partition.

Figure 2:
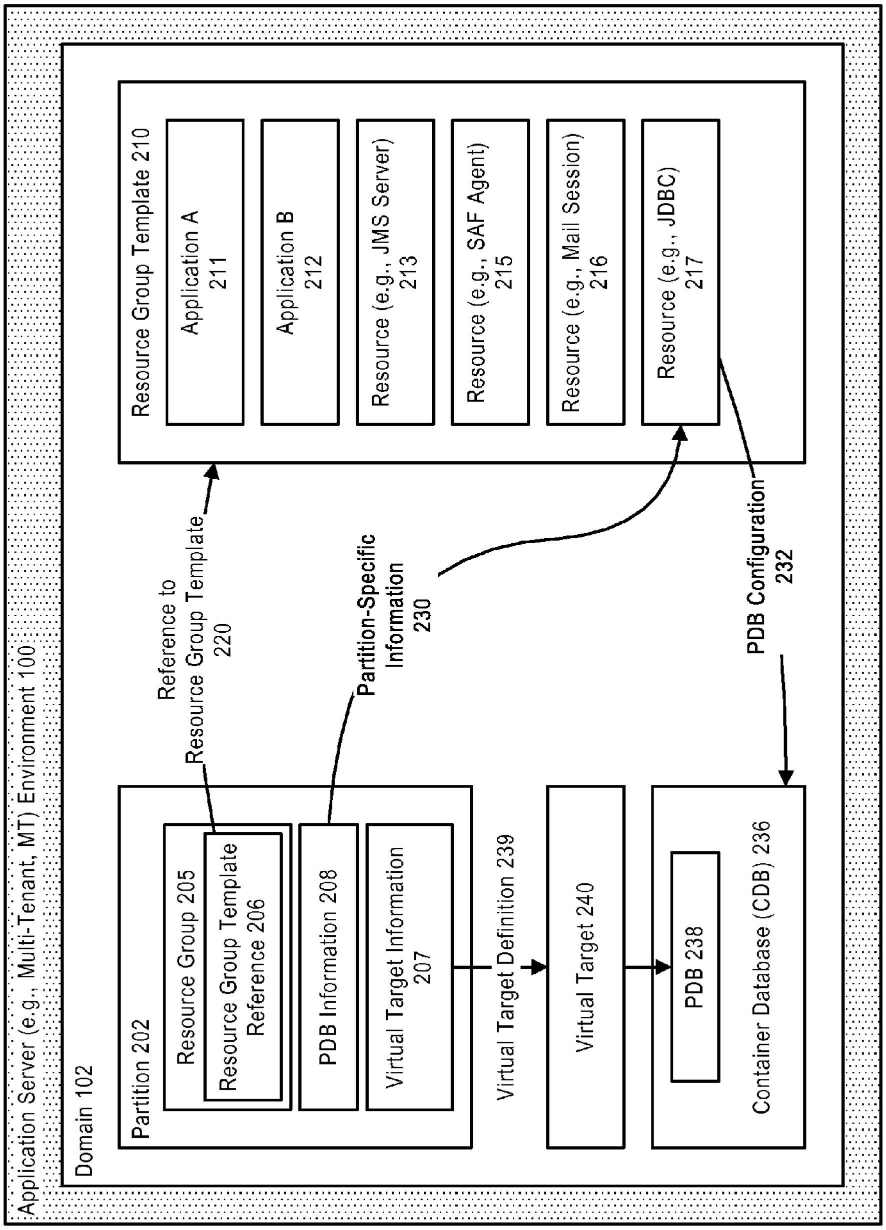
FIG. 2 further illustrates a system for supporting multi-tenancy in an application server, cloud, or other environment, in accordance with an embodiment.

FIG. 2 further illustrates a system for supporting multi-tenancy in an application server, cloud, or other environment, in accordance with an embodiment.

As illustrated in FIG. 2, in accordance with an embodiment, a partition 202 can include, for example, a resource group 205 which includes a reference 206 to a resource group template 210, a virtual target (e.g., virtual host) information 207, and a pluggable database (PDB) information 208. A resource group template (e.g., 210) can define, for example, a plurality of applications A 211 and B 212, together with resources such as a Java Message Server (JMS) server 213, store-and-forward (SAF) agent 215, mail session component 216, or Java Database Connectivity (JDBC) resource 217.

The resource group template illustrated in FIG. 2 is provided by way of example; in accordance with other embodiments, different types of resource group templates and elements can be provided.

In accordance with an embodiment, when a resource group within a partition (e.g., 202) references 220 a particular resource group template (e.g., 210), information associated with a particular partition can be used in combination with the referenced resource group template, to indicate a partition-specific information 230, for example a partition-specific PDB information. The partition-specific information can then be used by the application server to configure resources, for example a PDB resource, for use by the partition. For example, partition-specific PDB information associated with partition 202 can be used, by the application server, to configure 232 a container database (CDB) 236 with an appropriate PDB 238, for use by that partition.

Similarly, in accordance with an embodiment, a virtual target information associated with a particular partition can be used to define 239 a partition-specific virtual target 240, for use by the partition, e.g., baylandurgentcare.com, which can then be made accessible via a uniform resource locator (URL), e.g., http://baylandurgentcare.com.

Figure 3:
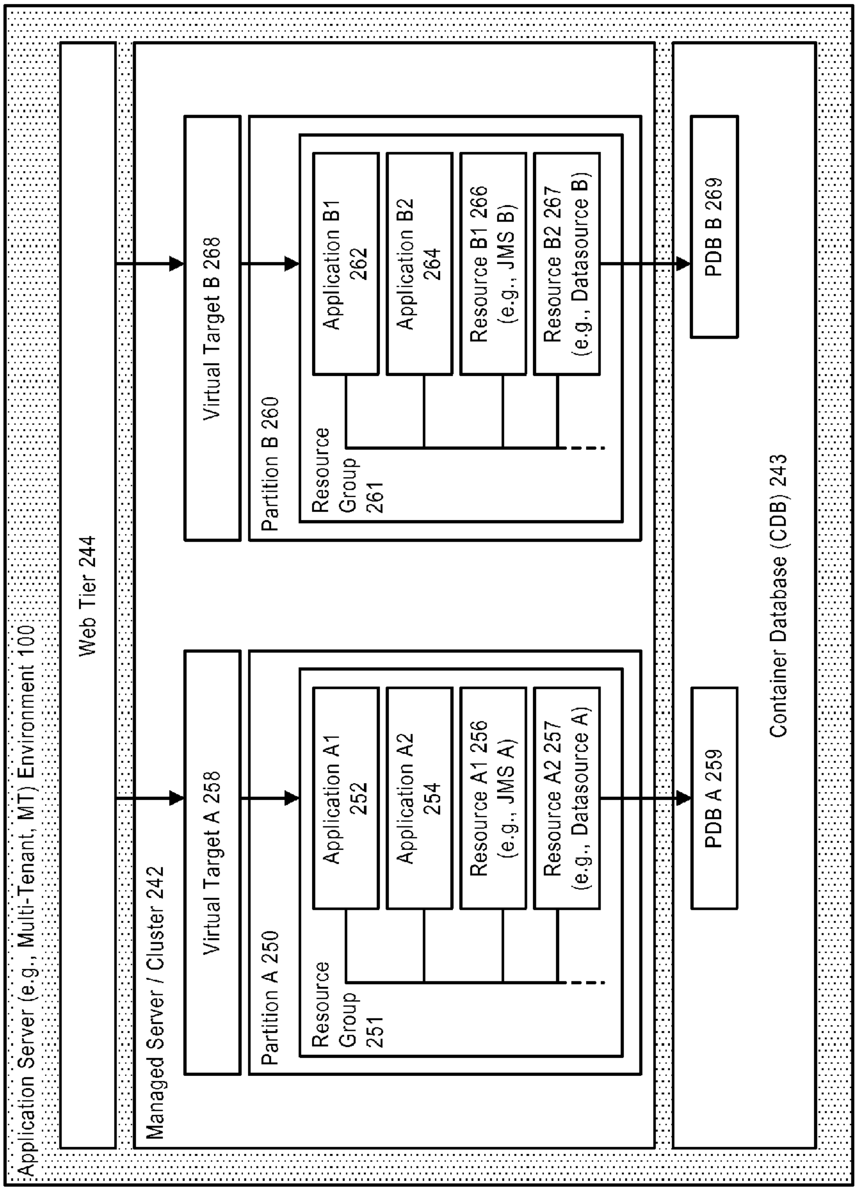
FIG. 3 further illustrates a system for supporting multi-tenancy in an application server, cloud, or other environment, in accordance with an embodiment.

FIG. 3 further illustrates a system for supporting multi-tenancy in an application server, cloud, or other environment, in accordance with an embodiment.

In accordance with an embodiment, a system configuration such as a config.xml configuration file, is used to define a partition, including configuration elements for resource groups associated with that partition, and/or other partition properties. Values can be specified per-partition using property name/value pairs.

In accordance with an embodiment, a plurality of partitions can be executed within a managed server/cluster 242, or a similar environment which can provide access to a CDB 243, and which are accessible via a web tier 244. This allows, for example, a domain or partition to be associated with one or more of the PDBs (of the CDB).

In accordance with an embodiment, each of the plurality of partitions, in this example partition A 250 and partition B 260, can be configured to include a plurality of resources associated with that partition. For example, partition A can be configured to include a resource group 251 which contains an application A1 252, application A2 254, and JMS A 256, together with a datasource A 257 associated with PDB A 259, wherein the partition is accessible via a virtual target A 258. Similarly, partition B 260 can be configured to include a resource group 261 which contains an application B1 262, application B2 264, and JMS B 266, together with a datasource B 267 associated with PDB B 269, wherein the partition is accessible via a virtual target B 268.

While several of the above examples illustrate use of CDB and PDBs, in accordance with other embodiments, other types of multi-tenant or non-multi-tenant databases can be supported, wherein a particular configuration can be provided for each partition, for example through the use of schemas, or the use of different databases.

Resources

In accordance with an embodiment, a resource is a system resource, application, or other resource or object that can be deployed to a domain of the environment. For example, in accordance with an embodiment, a resource can be an application, JMS, JDBC, JavaMail, WLDF, data source, or other system resource or other type of object that can be deployed to a server, cluster, or other application server target.

Partitions

In accordance with an embodiment, a partition is a runtime and administrative subdivision or slice of a domain that can be associated with a partition identifier (ID) and configuration, and can contain applications and/or refer to domain-wide resources through the use of resource groups and resource group templates.

Generally, a partition can contain its own applications, refer to domain wide applications via resource group templates, and have its own configuration. Partitionable entities can include resources, for example JMS, JDBC, JavaMail, WLDF resources, and other components, such as JNDI namespace, network traffic, work managers, and security policies and realms. In the context of a multi-tenant environment, the system can be configured to provide tenant access to the administrative and runtime aspects of partitions associated with a tenant.

In accordance with an embodiment, each resource group within a partition can optionally reference a resource group template. A partition can have multiple resource groups, and each of them can reference a resource group template. Each partition can define properties for configuration data that is not specified in the resource group templates to which the partition's resource groups refer. This enables the partition to act as a binding of deployable resources defined in a resource group template, to specific values for use with that partition. In some cases, a partition can override configuration information specified by a resource group template.

In accordance with an embodiment, a partition configuration, as defined for example by a config.xml configuration file, can include a plurality of configuration elements, for example: "partition", which contains the attributes and child elements that define the partition; "resource-group", which contains the applications and resources deployed to the partition; "resource-group-template", which contains applications and resources defined by that template; "jdbc-system-resource-override", which contains a database-specific service name, user name, and password; and "partition-properties", which contains property key values that can be used for macro replacement in resource group templates.

Upon startup, the system can use the information provided by the configuration file to generate partition-specific configuration elements for each resource, from the resource group template.

Resource Groups

In accordance with an embodiment, a resource group is a named, fully-qualified collection of deployable resources that can be defined either at a domain or partition level, and can reference a resource group template. The resources in a resource group are considered fully-qualified in that the administrator has provided all of the information needed to start or connect to those resources, for example the credentials for connecting to a data source, or the targeting information for an application.

A system administrator can declare resource groups at the domain level, or at the partition level. At the domain level, a resource group provides a convenient way to group related resources. The system can manage resources declared in a domain-level resource group the same as ungrouped resources, so that the resources can be started during system start-up, and stopped during system shut-down. An administrator can also stop, start, or remove a resource in a group individually, and can act on all the resources in a group implicitly by operating on the group. For example, stopping a resource group stops all of the resources in the group that are not already stopped; starting the resource group starts any resources in the group that are not already started; and removing the resource group removes all of the resources contained in the group.

At the partition level, a system or partition administrator can configure zero or more resource groups in a partition, subject to any security restrictions. For example, in a SaaS use case, various partition-level resource groups can refer to domain-level resource group templates; while in a PaaS use case, partition-level resource groups can be created that do not refer to resource group templates, but instead represent applications and their related resources that are to be made available within that partition only.

In accordance with an embodiment, resource grouping can be used to group together applications and the resources they use as a distinct administrative unit within the domain. For example, in the medical records (MedRec) application described below, a resource grouping defines the MedRec application and its resources. Multiple partitions can run the same MedRec resource group, each using a partition-specific configuration information, such that the applications that are part of each MedRec instance are made specific to each partition.

Resource Group Templates

In accordance with an embodiment, a resource group template is a collection of deployable resources that are defined at a domain level, that can be referenced from a resource group, and some of the information required to activate its resources may not be stored as part of the template itself, such that it supports the specification of partition level configuration. A domain can contain any number of resource group templates, each of which can include, for example, one or more related Java applications and the resources on which those applications depend. Some of the information about such resources may be the same across all partitions, while other information may vary from one partition to the next. Not all configuration need be specified at the domain level—partition level configuration can instead be specified in the resource group template through the use of macros, or property name/value pairs.

In accordance with an embodiment, a particular resource group template can be referenced by one or more resource groups. Generally, within any given partition, a resource group template can be referenced by one resource group at a time, i.e., not simultaneously by multiple resource groups within the same partition; however, it can be referenced at the same time by another resource group in a different partition. The object containing the resource group, e.g., the domain or partition, can use property name/value assignments to set the value of any tokens in the resource group template. When the system activates a resource group template using a referencing resource group, it can replace those tokens with values set in the resource group's containing object. In some cases, the system can also use statically-configured resource group templates and partitions to generate runtime configuration for each partition/template combination.

For example, in a SaaS use case, the system can activate the same applications and resources multiple times, including once for each partition that will use them. When an administrator defines a resource group template they can use tokens to represent the information that will be supplied elsewhere. For example, the username to use in connecting to a CRM-related data resource can be indicated in the resource group template as \${CRMDataUsername}.

Tenants

In accordance with an embodiment, in a multi-tenant environment, such as a multi-tenant (MT) application server environment, a tenant is an entity that can be represented by, or otherwise associated with, one or more partitions and/or one or more tenant-aware applications.

For example, tenants can represent distinct user organizations, such as different external companies, or different departments within a particular enterprise (e.g., HR and Finance departments), each of which can be associated with a different partition. A tenant globally unique identity (tenant ID) is the association of a particular user, at a particular moment in time, with a particular tenant. The system can derive which tenant a particular user belongs to from the user identity, for example by referring to a user identity store. The user identity enables the system to enforce those actions that a user is authorized to perform, including, but not limited to, which tenant the user may belong.

In accordance with an embodiment, the system enables isolation of the administration and runtime of different tenants from each other. For example, tenants can configure some behaviors of their applications, and resources to which they have access. The system can ensure that a particular tenant cannot administer artifacts belonging to another tenant; and, at runtime, that the applications working on behalf of a particular tenant refer only to resources associated with that tenant, and not to resources associated with other tenants.

In accordance with an embodiment, a tenant-unaware application is one that contains no logic dealing with tenants explicitly, such that any resources that the application uses may be accessible regardless of what user submitted a request to which the application is responding. In contrast, a tenant-aware application includes logic that explicitly deals with tenants. For example, based on a user's identity the application can derive the tenant to which the user belongs and use that information to access tenant-specific resources.

In accordance with an embodiment, the system enables users to deploy applications that are explicitly written to be tenant-aware, so that application developers can obtain the tenant ID of a current tenant. The tenant-aware application can then use the tenant ID to handle multiple tenants that are using a single instance of the application.

For example, the MedRec application, which supports a single doctor's office or hospital, can be exposed to two different partitions or tenants, e.g., a Bayland Urgent Care tenant, and a Valley Health tenant, each of which is able to access separate tenant-specific resources, such as separate PDBs, without changing the underlying application code.

Exemplary Domain Configuration and Multi-Tenant Environment

In accordance with an embodiment, applications can be deployed to a resource group template at the domain level, or to a resource group that is scoped to a partition or scoped to the domain. Application configuration can be overridden using deployment plans specified per-application, or per-partition. Deployment plans can also be specified as part of a resource group.

Figure 4:
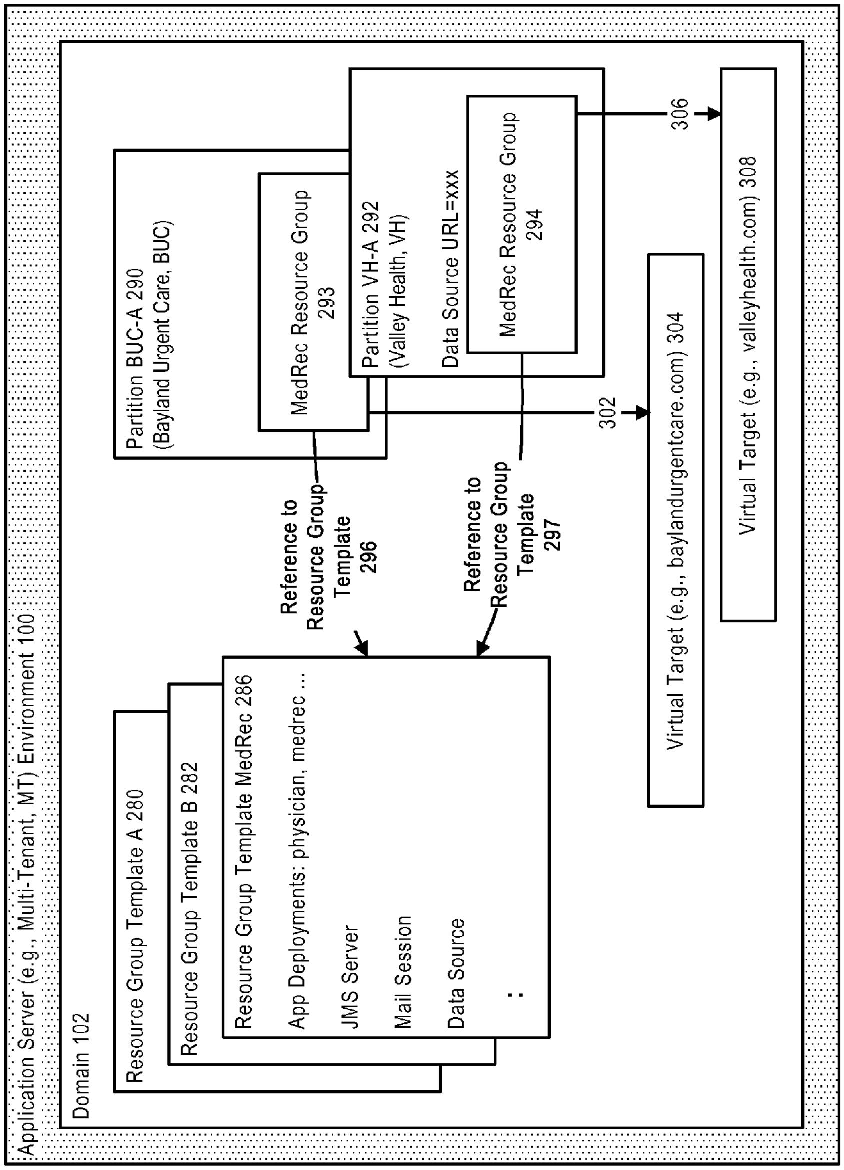
FIG. 4 illustrates a domain configuration for use with an exemplary multi-tenant environment, in accordance with an embodiment.

FIG. 4 illustrates a domain configuration for use with an exemplary multi-tenant environment, in accordance with an embodiment.

In accordance with an embodiment, when the system starts a partition, it creates virtual targets (e.g., virtual hosts) and connection pools, including one for each partition, to respective database instances, according to the provided configuration.

Typically, each resource group template can include one or more related applications and the resources on which those applications depend. Each partition can provide configuration data that is not specified in the resource group templates to which it refers, by providing a binding of the deployable resources in resource group templates to specific values associated with the partition; including, in some cases, overriding certain configuration information specified by the resource group template. This enables the system to activate an application represented by a resource group template differently for each partition, using the property values each partition has defined.

In some instances, a partition may contain resource groups that do not refer to resource group templates, or that directly define their own partition-scoped deployable resources. Applications and data sources that are defined within a partition are generally available only to that partition. Resources can be deployed so that they can be accessed from across partitions using partition:<partitionName>/<resource JNDI name>, or domain:<resource JNDI name>.

For example, a MedRec application can include a plurality of Java applications, a data source, a JMS server, and a mail session. To run the MedRec application for multiple tenants, the system administrator can define a single MedRec resource group template 286, declaring those deployable resources in the template.

In contrast to domain-level deployable resources, the deployable resources declared in a resource group template may not be fully configured in the template, or cannot be activated as-is, since they lack some configuration information.

For example, the MedRec resource group template may declare a data source used by the applications, but it may not specify a URL for connecting to the database. Partitions associated with different tenants, for example, partition BUC-A 290 (Bayland Urgent Care, BUC) and partition VH-A 292 (Valley Health, VH) can reference one or more resource group templates, by each including a MedRec resource group 293, 294 that references 296, 297 the MedRec resource group template. The reference can then be used to create 302, 306, the virtual targets/virtual hosts for each tenant, including a virtual host baylandurgentcare.com 304 associated with the BUC-A partition, for use by the Bayland Urgent Care tenant; and a virtual host valleyhealth.com 308 associated with the VH-A partition, for use by the Valley Health tenant.

Figure 5:
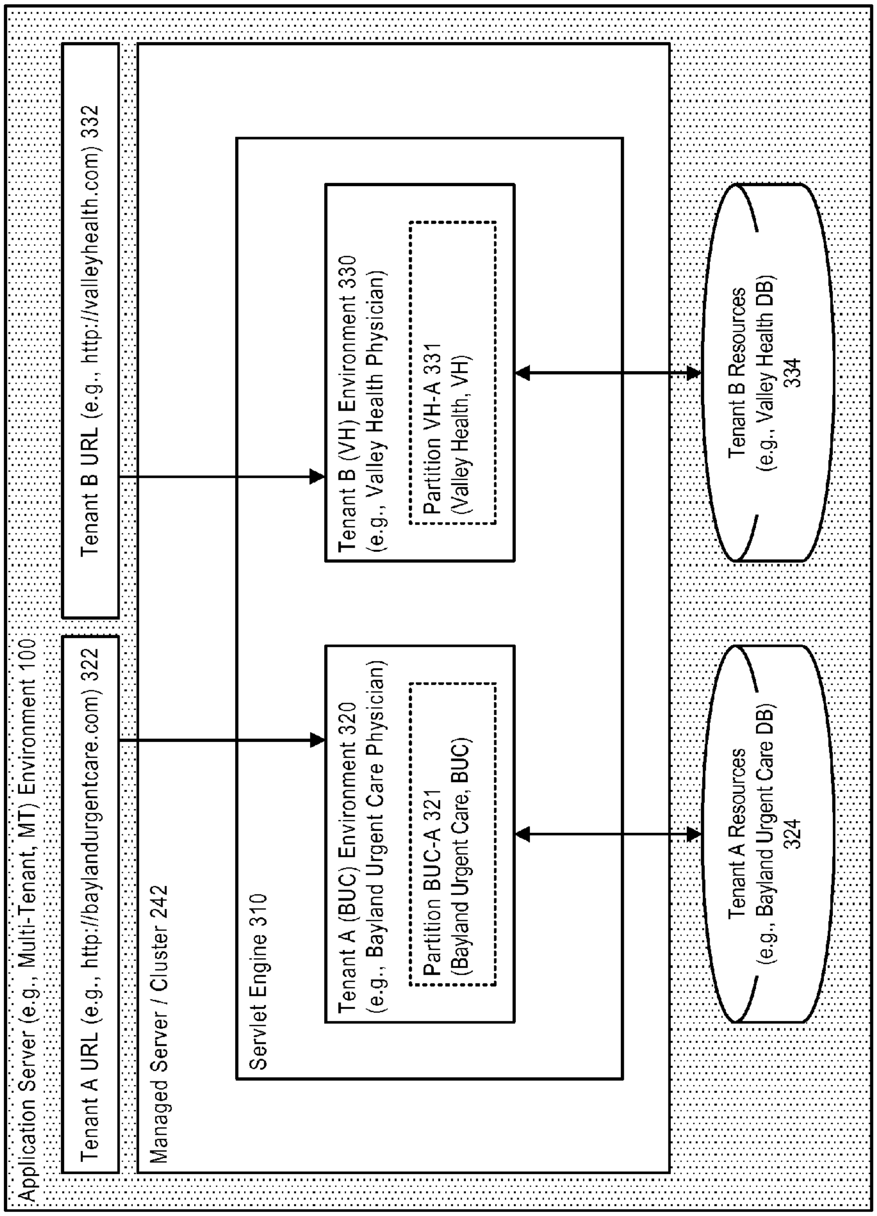
FIG. 5 further illustrates an exemplary multi-tenant environment, in accordance with an embodiment.

FIG. 5 further illustrates an exemplary multi-tenant environment, in accordance with an embodiment. As illustrated in FIG. 5, and continuing the example from above, in which two partitions reference the MedRec resource group template, in accordance with an embodiment, a servlet engine 310 can be used to support a plurality of tenant environments, in this example a Bayland Urgent Care Physician tenant environment 320, and a Valley Health Physician tenant environment 330.

In accordance with an embodiment, each partition 321, 331 can define a different virtual target on which to accept incoming traffic for that tenant environment, and a different URL 322, 332 for connecting to the partition and to its resources 324, 334, including in this example either a Bayland Urgent Care database, or a Valley Health database respectively. The database instances can use compatible schemas, since the same application code will execute against both databases. When the system starts the partitions, it can create the virtual targets and connection pools to the respective database instances.

Dynamic Debugging

In various situations within an application server environment, problems, such as intermittent and otherwise difficult to reproduce issues, can occur. Data associated with such problems and issues can sometimes be wanted in order to understand and fix a root cause of the issues. In some cases, existing debugging mechanisms can provide too much information, and be too expensive or too slow to be feasible. Some existing debugging mechanisms require that the debugging code be already in the product. Additionally, it can happen that debugging mechanisms do not exist within the code. Even in situations where debugging code is present, executing the existing debugging code can be too expensive (i.e., requiring a restart of the servers) to run. As well, if the problems the debugging code are attempting to gather information on are timing related (e.g., transitory problems), a server restart as required by the debugging code can alleviate the transitory problem, thus preventing the debugging code from gathering information.

In order to get more information in such situations, debugging patches can be generated to gather more insight into the problem. The focus of such patches is usually to gather more information, and not necessarily provide a final fix. Typically, such patches are created and sent out to be installed in production environments. Because such debugging jars are put in the class-path, server instances often need to be restarted for them to take effect, potentially negating the purpose of the debugging jars. This poses several problems. For example, it may not be possible to bring down their servers in production environment due to scheduling constraints. Additionally, after restarting the servers, in-memory states can be lost so it is possible that the problem may either go away or may take a while to re-appear. Requiring servers to be bounced can also add hurdles to getting the debug patches installed quickly, and thus for getting timely information to understand the nature of the problem.

In accordance with an embodiment, the present system and method can allow for dynamically debugging/dynamic debug patching without requiring server restarts in an application server environment. This can be useful when additional information is wanted in order to diagnose problems and errors without requiring expensive and time consuming server restarts. Dynamic debugging can be useful in varied situations and use cases.

In accordance with an embodiment, the terms dynamic debugging and dynamic debug patching can be used interchangeably. When referring to a dynamic debug patch, the present disclosure can be referring to a dynamic debug construct, or filetype that can be used to provide diagnostic information, such as a dynamic debug jar (Java Archive) file. A jar file format can be a package file format used to aggregate Java class files and, optionally, associated metadata and resources (text, images, and the like) into a file in order to distribute application software or libraries on a Java platform.

As an exemplary use case, within a SaaS use case, for example, an intermittent problem can be reported. In order to diagnose the intermittent problem, a dynamic debug jar can be implemented in order to capture additional information related to the problem. The dynamic debug jar can be prepared in order to gather the desired additional information, and can be activated on a cluster of managed servers running the problematic application without restarting the servers. The dynamic debug jar can be activated within the cluster using a scripting tool, such as WebLogic Scripting Tool (WLST). Output, such as diagnostic information, generated by the dynamic debug jar can be used to isolate the intermittent problem and provide a fix. When the debug patch jar is not needed anymore, it can be deactivated.

In accordance with an embodiment, a dynamic debug jar includes instrumented classes and can replace, sometimes temporarily, existing classes within a server. The shape of the classes within the dynamic debug jar can be the same as the shape of the classes replaced within the active server.

In accordance with an embodiment, dynamic debugging can be performed iteratively if, for example, a single implementation of a dynamic debug patch does not provide enough information to fix a problem. In an iterative process, diagnostic information captured by a first implementation of a dynamic debug patch can be used in designing and implementing a next dynamic debug patch. Because dynamic debugging does not require expensive and time consuming server restarts, an iterative process of dynamic debugging is feasible.

Figure 6:
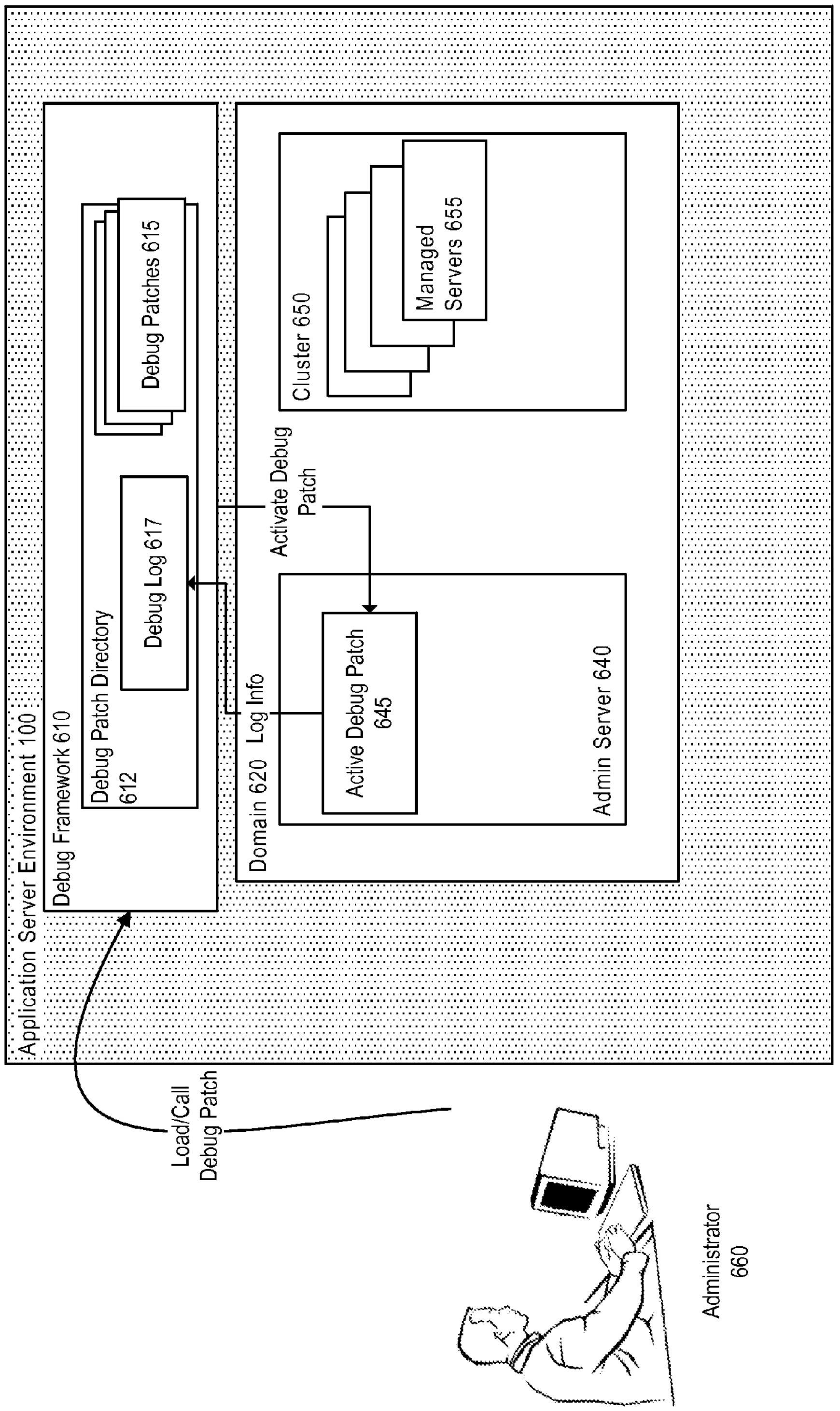
FIG. 6 illustrates dynamic debugging in an application server environment, in accordance with an embodiment.

FIG. 6 illustrates dynamic debugging in an application server environment, in accordance with an embodiment. As depicted in FIG. 6, an application server environment 100 can include a debug framework 610, and a domain 620. The debugging framework 610 can include a debug patch directory 612, which in turn can include a number of debug patches 615 and a debug log 617. The debug patches in the debug patch directory can be pre-existing (pre-loaded), or can be loaded into the debug patch directory by an application or a user with sufficient authority, such as an administrator 660. The domain 620 can include an administration server 640 as well as a cluster 650 of managed servers 655.

The administration server 640 can be a central point from which the configuration and management of system resources within the domain takes place. Applications, such as web applications, and other resources can be deployed onto the managed servers within the cluster of managed servers.

In accordance with an embodiment, in a situation where a problem has arisen, for example, in the administration server 640, more information can be desired/needed in order to diagnose and fix the problem. A debug patch can be used to provide such additional information. As shown in FIG. 6, an administrator can, optionally (dependent upon the debug patches already contained in the debug patch directory), load a debug patch into the debug patch directory or call a pre-existing debug patch to be activated inside the administration server, resulting in an active debug patch 645. Information about the problem collected by the active debug patch 645 can be logged into the debug log 617. The administrator can accomplish this, for example, via a scripting tool, such as WLST. The problem appearing in the administration server is merely illustrative—debug patches can be activated throughout the domain where necessary.

In accordance with an embodiment, the system can leverage JDK (Java Developer's Kit) hot-swap instrumentation feature to dynamically replace original classes (i.e., those classes pre-existing within the administration server) with instrumented classes within the debug patch (e.g., debug jar). The JDK hot-swap functionality allows classes of the same shape to be swapped out while maintaining states of instantiated objects in memory. The classes in the debug jars can have the same set of constructors, methods, fields, and the like of the classes the debug jar is replacing within the administration server. By utilizing the JDK hot-swap functionality, the active debug patch 645 (with included instrumented classes) can replace classes within the administration server without requiring a server restart.

In accordance with an embodiment, before the active debug patch is activated within the server, it can be checked to ensure the content of the debug patch is consistent with what is already active within the server. If an inconsistency is found (e.g., at least one of the classes in the debug patch is inconsistent with an active class within the server), the patch can be bounced and not deployed.

Figure 7:
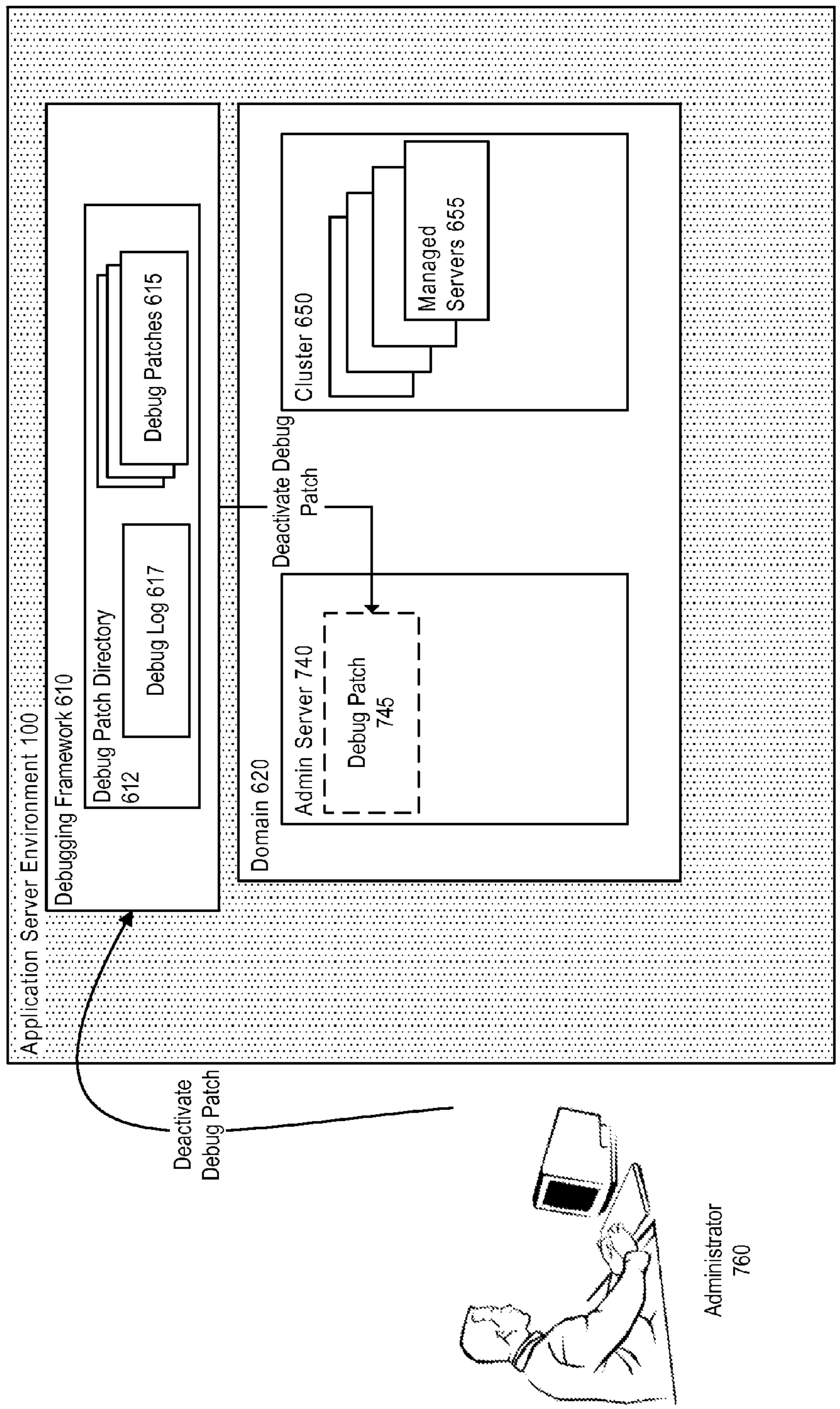
FIG. 7 illustrates dynamic debugging in an application server environment, in accordance with an embodiment.

FIG. 7 illustrates dynamic debugging in an application server environment, in accordance with an embodiment. As depicted in FIG. 7, an application server environment 100 can include a debug framework 610, and a domain 620. The debugging framework 610 can include a debug patch directory 612, which in turn can include a number of debug patches 615 and a debug log 617. The debug patches in the debug patch directory can be pre-existing (pre-loaded), or can be loaded into the debug patch directory by an application or a user with sufficient authority, such as an administrator 760. The domain 620 can include an administration server 740 as well as a cluster 650 of managed servers 655.

In accordance with an embodiment, in a situation where a problem arose in, for example, the administration server 740, a debug patch can be deployed (see, e.g., FIG. 6). After the information has been extracted via the instrumented classes of the debug patch, the administrator 760 can signal the debug framework 610, via a scripting tool such as WLST, to deactivate the debug patch 745. By deactivating the debug patch 745, the system can restore the original classes from the classpath to be made active. By leveraging the JDK hot-swap functionality, it can be possible to deactivate the debug patch without restarting the server or servers.

Figure 8:
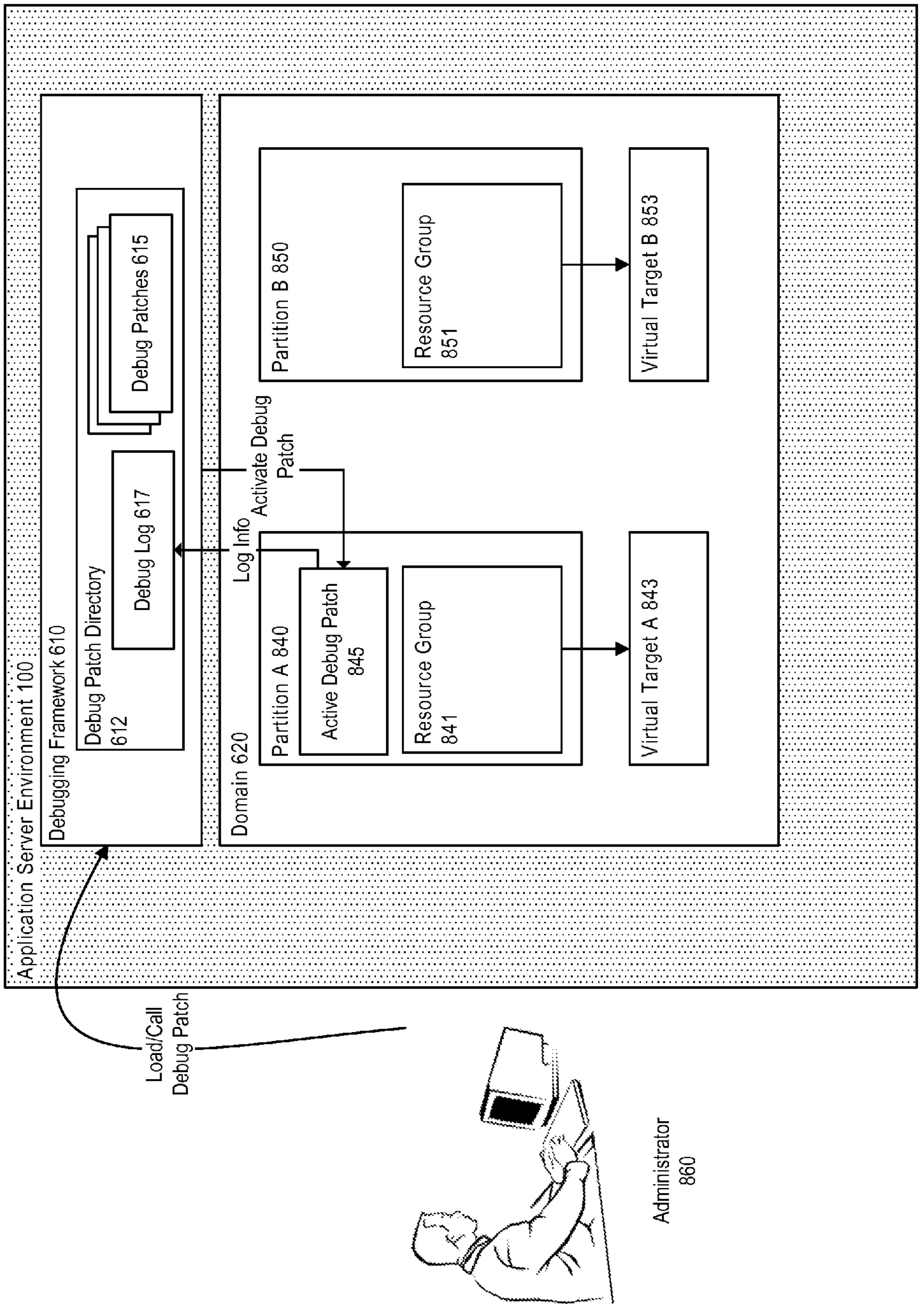
FIG. 8 illustrates dynamic debugging in an application server environment, in accordance with an embodiment.

FIG. 8 illustrates dynamic debugging in an application server environment, in accordance with an embodiment. As depicted in FIG. 8, an application server environment 100 can include a debug framework 610, and a domain 620. The debugging framework 610 can include a debug patch directory 612, which in turn can include a number of debug patches 615 and a debug log 617. The debug patches in the debug patch directory can be pre-existing (pre-loaded), or can be loaded into the debug patch directory by an application or a user with sufficient authority, such as an administrator 860. The domain 620 can include partition A 840, partition B 850, virtual target A 843, and virtual target B 853. Partitions A and B can each contain a resource group, 841 and 851, respectively. Resource groups 841 and 851 can be associated with virtual targets A 843 and virtual target B 853, respectively.

In accordance with an embodiment, in a situation where a problem as arisen in, for example, partition A 840, and more information is needed/wanted in order to diagnose and fix the problem, a debug patch can be used to provide the additional information. As shown in FIG. 8, an administrator can, optionally (dependent upon the debug patches already contained in the debug patch directory), load a debug patch into the debug patch directory or call a pre-existing debug patch to be activated inside partition A, resulting in an active debug patch 845. Information about the problem collected by the active debug patch 845 can be logged into the debug log 617. The administrator can accomplish this, for example, via a scripting tool, such as WLST.

The system can, in accordance with an embodiment, leverage JDK's (Java Developer's Kit) hot-swap instrumentation feature to dynamically replace original classes (i.e., those classes pre-existing within the partition) with instrumented classes within the debug patch (e.g., debug jar). The JDK hot-swap functionality allows classes of the same shape to be swapped out while maintaining states of instantiated objects in memory. Put another way, the classes in the debug jars can have the same set of constructors, methods, fields, and the like of the classes the debug jar is replacing within the partition. By utilizing the JDK hot-swap functionality, the active debug patch 845 (with included instrumented classes) can replace classes within the partition without requiring a server restart.

In accordance with an embodiment, before the active debug patch is activated within the partition, it can be checked to ensure that what is in the debug patch is consistent with what is already active within the partition. If an inconsistency is found (e.g., at least one of the classes in the debug patch is inconsistent with an active class within the partition), the patch can be bounced and not deployed.

In accordance with an embodiment, the activated debug patch can be scoped to the partition within which it is activated. In embodiments where the debug patch is scoped to a partition, the debug patch will not be accessible by other partitions within the domain.

Figure 9:
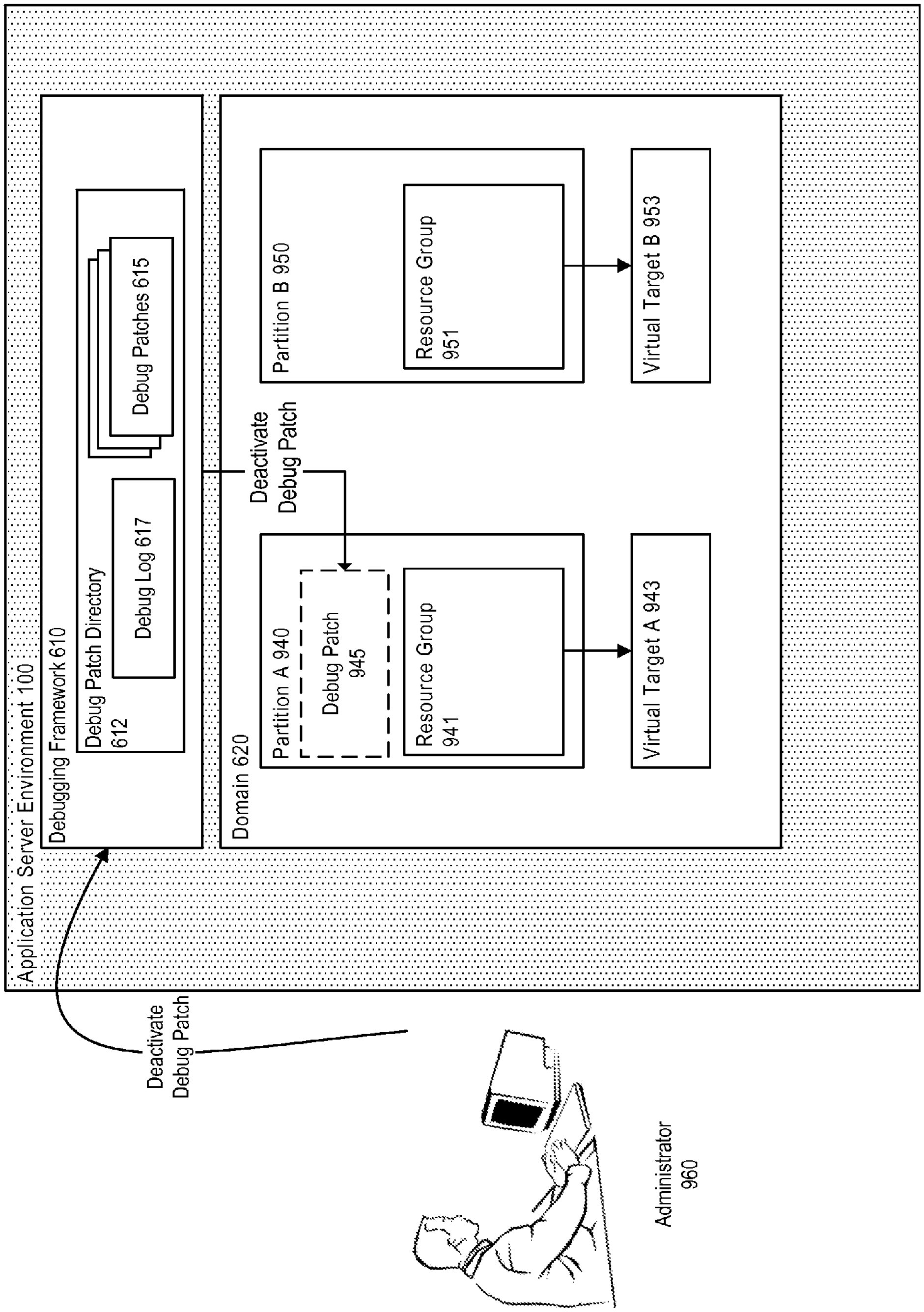
FIG. 9 illustrates dynamic debugging in an application server environment, in accordance with an embodiment.

FIG. 9 illustrates dynamic debugging in an application server environment, in accordance with an embodiment. As depicted in FIG. 9, an application server environment 100 can include a debug framework 610, and a domain 620. The debugging framework 610 can include a debug patch directory 612, which in turn can include a number of debug patches 615 and a debug log 617. The debug patches in the debug patch directory can be pre-existing (pre-loaded), or can be loaded into the debug patch directory by an application or a user with sufficient authority, such as an administrator 860. The domain 620 can include partition A 840, partition B 850, virtual target A 843, and virtual target B 853. Partitions A and B can each contain a resource group, 841 and 851, respectively. Resource groups 841 and 851 can be associated with virtual targets A 843 and virtual target B 853, respectively.

In accordance with an embodiment, in a situation where a problem arose in, for example, partition A 940, and a debug patch was deployed (see, e.g., FIG. 8). After the information has been extracted via the instrumented classes of the debug patch, the administrator 960 can signal the debug framework 610, via a scripting tool such as WLST, to deactivate the debug patch 945. By deactivating the debug patch 945, the system will restore the original classes from the classpath to be made active. By leveraging the JDK hot-swap functionality, it can be possible to deactivate the debug patch without restarting the server or servers.

Figure 10:
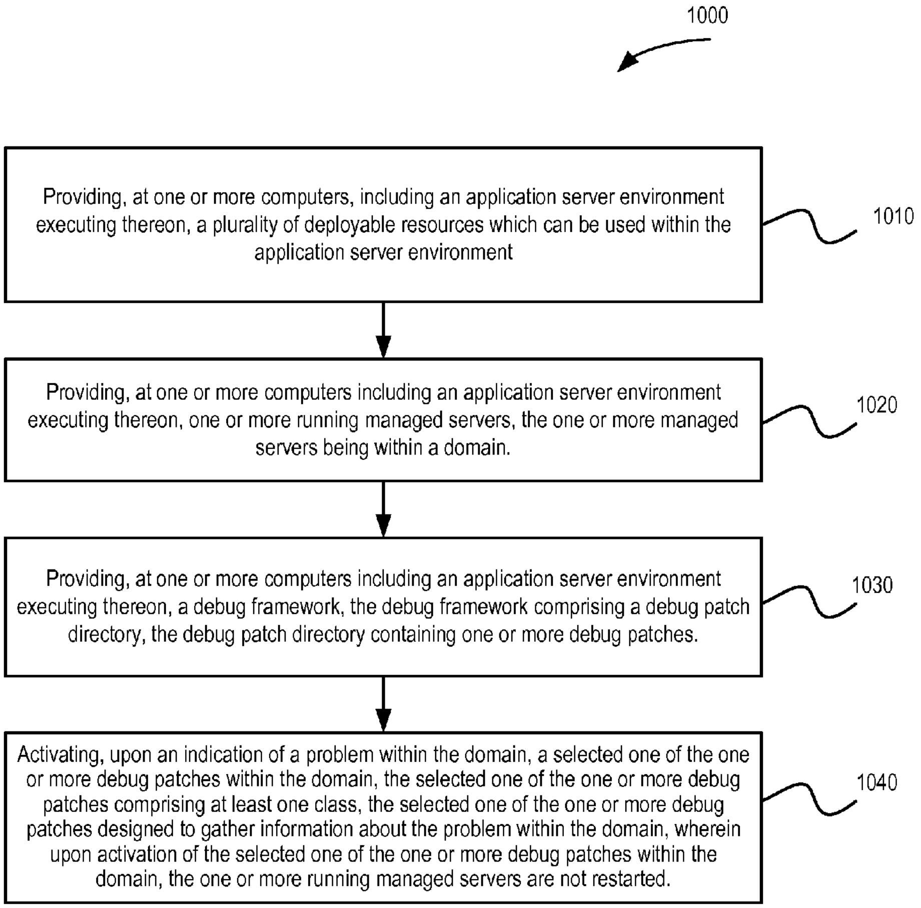
FIG. 10 illustrates, via a flow chart, a method for dynamic debugging within an application server environment, in accordance with an embodiment.

FIG. 10 illustrates, via a flow chart, a method for dynamic debugging within an application server environment, in accordance with an embodiment. The exemplary method 1000 can begin at step 1010 with providing, at one or more computers, including an application server environment executing thereon, a plurality of deployable resources which can be used within the application server environment.

At step 1020, the method can provide, at one or more computers, including an application server environment executing thereon, one or more running managed servers, the one or more managed servers being within a domain.

At step 1030, the method can continue with providing, at one or more computers, including an application server environment executing thereon, a debug framework, the debug framework comprising a debug patch directory, the debug patch directory containing one or more debug patches.

At step 1040, the method can activate, upon an indication of a problem within the domain, a selected one of the one or more debug patches within the domain, the selected one of the one or more debug patches comprising at least one class, the selected one of the one or more debug patches designed to gather information about the problem within the domain, wherein upon activation of the selected one of the one or more debug patches within the domain, the one or more running managed servers are not restarted.

Dynamic Activation and Deactivation

In accordance with an embodiment, it can be possible to activate debug patches dynamically without server restarts on servers and/or clusters within the domain from a single place. Similarly, when the debug patches are not needed any more, it will be possible to deactivate them without restarting the server. When the system deactivates the activated debug patches, the original classes (that the debug patches replaced on activation) can be restored from the classpath to be made active. This can be accomplished from, for example, a scripting tool, such as WebLogic Scripting Tool, via provided commands provided for activating and deactivating dynamic debug patches. Commands in the scripting tool can also be provided to view all active and available debug patches in a domain.

Hot-Swap Classes

In accordance with an embodiment, the system can dynamically replace classes that were loaded by a system classloader. These classes include, for example, WebLogic Server classes as well as classed from third-party libraries which can be on the system classpath. Additionally, the system can dynamically replace application classes and limit the scope of replacement to a specific application, and optionally, specific module within the application. For example, different applications may be using shared libraries, but a problem may have arisen on only one application and not others using the shared library. In such situations, the system can limit the scope to the one targeted application.

Atomicity

If the shape of an instrumented class (i.e., within a debug patch), in accordance with an embodiment, is different from the original class, hot-swap for the class can fail. While replacing several classes at a time, atomicity can be maintained. In other words, hot-swap of all classes in the debug jar either succeeds fully, or fails and preserves original classes.

Debug Patch Directory

In accordance with an embodiment, a domain-wide configuration setting can be provided to specify a directory from where debug patches may be loaded. Debug jar files in the specified directory may be picked up and activated. This directory can be protected with file system permissions, and the debug jar files can be copied there by users who have appropriate permissions, such as administrators.

Debug patch jars can be picked up from a specific directory. A domain-wide configuration setting can specify the location of the debug patch directory. This directory can be assumed to be protected with file-system permissions.

In accordance with an embodiment, debug patch jars are ordinary jar files containing classes. The jar files may contain an optional README.TXT file containing details about the patch.

Debugging

In accordance with an embodiment, dynamic debugging can avoid server restarts while applying instrumented debug patches for gathering additional information. The present disclosure can leverage an instrumentation agent feature provided in JDK. Using JDK, the present system can hot-swap classes provided in debug jars using a WLDF instrumentation agent. The present system does not re-instrument the classes in the debug jars, but merely replace loaded classes with versions provided in the debug jars. An exemplary process can begin when a user runs into a problem, and existing debug features fail to provide sufficient insight to solve the issue. A debug patch, designed to provide additional information and insight into the encountered problem, can be prepared and/or found within an existing debug patch directory. The selected debug patch can then be validated to ensure that it can be successfully activated in an application server environment (i.e., the debug jar has the same shape as the classes the debug jar is replacing). The instrumented debug jar can, in situations where it is not already present, be uploaded in the debug patch director which is accessible from the domain. The debug patch can then be activated using commands via a scripting tool, such as WLST. Debug logs, if any, generated by the instrumented debug patches can be made visible in order to understand and fix the underlying problem. The process can be iterated again if necessary (e.g., when not enough information was generated by a first debug patch). When not needed any more, the debug patch can be deactivated.

In some embodiments, the debug patches are transient and will not survive a server restart. In such situations, the original classes will be loaded and the debug patch, if still needed, will need to be activated again via, for example, the process described above.

Instrumentation Agent

In accordance with an embodiment, an instrumentation agent can be provided to perform dynamic byte-code instrumentation of application classes when application instrumentation is enabled. The instrumentation can also provide support for dynamic debug patches so that classes included in the debug patch jars can be hot-swapped on demand. The instrumentation agent can certify that, when requested the agent can read class bytes from the debug jars and replace the loaded classes with the instrumented implementations without further transformations. The agent can also log an error message when the instrumented implementations do not match up with the classes already running. The agent can additionally provide informational messages that can indicate the initiation and completion of debug patch activation/deactivation, together with completion statues.

Runtime Operations

In accordance with an embodiment, when the application server environment is a WebLogic server, a new runtime MBean weblogic.management.runtime. WLDFDebugPatchesRuntimeMBean can be provided which will support operations to list, activate and deactivate debug patches on individual server instances. This MBean and its methods can be marked @exclude and are not documented. These operations can be invoked by JMX clients, however, the operations are primarily intended for tools such as WLST to provide more user-friendly interfaces.

WLST Commands

In accordance with an embodiment, while connected to an administration server, commands may be applied to multiple managed servers and/or clusters in one step. If connected to a (non-admin) managed server, the commands can apply to the connected managed server, and not those other servers not connected to. In the commands described below, the Target (optional) parameter can only be specified while connected to the administration server. When connected to the admin server, the command will apply to all servers implied by the list of servers and/or clusters specified by the Target parameter. If the Target parameter is specified while connected to a managed server, the command will fail with an error, as the command can apply to the connected server, and not others. If the Target parameter is not specified, and a user is connected to the administration server only, the command will apply only to the admin server.

List Debug Patches Command

In accordance with an embodiment, a command, such as listDebugPatches, can list debug patches available in the debug patch directory for the applicable target servers. Active and inactive patches can be listed separately. Active patches can be listed in the order in which they are activated. Parameters for the command can include Target (Optional). The Target (Optional) parameter can be a comma separated list of servers and/or clusters from where the list of available and active debug patches can be displayed. The result of such a command can list available and active patches on specified targets. Here is an example command:

```
listDebugPatches( )
myserver:
  Available:
    debug-patch-01.jar
  Active:
    debug-patch-02.jar [System]
    debug-patch-03.jar [medrec]
listDebugPatches(Target='Cluster-1')
MS1:
  Available:
    debug-patch-01.jar
    debug-patch-02.jar
  Active:
    debug-patch-03.jar [medrec]
MS2:
  Available:
    debug-patch-01.jar
    debug-patch-02.jar
  Active:
    debug-patch-03.jar [medrec]
```

Show Debug Patch Information Command

In accordance with an embodiment, a command, such as showDebugPatchInfo, can display details about a debug patch available in the debug patch directory. The details can list classes contained in the patch jar. Additionally, if the patch jar contains an optional README.TXT file, the README.TXT file's contents can also be displayed. Parameters for the command can include Patch and Target (Optional). The Patch parameter can designate the debug patch for which details are wanted. The Target (Optional) parameter can be a comma separated list of servers and/or clusters from where the list of available and active debug patches can be displayed. A result of the command can display details about a specific debug patch.

Activate Debug Patch Command

In accordance with an embodiment, an activate debug patch command, such as activateDebugPatch can activate a debug patch, optionally on specified targets. In situations where a specified debug patch is not available in the debug patch directory on a target server, a warning can be issued and command will proceed to attempt to activate the patch on remaining targets. If one of the classes in the patch fails to replace the original class on a target, the entire patch jar can be rejected on that target. The command can continue to attempt to activate the patch on remaining targets. It should be noted that several debug patches may be activated over time. Each debug patch can overlay original classes and previously activated debug patches. This means that if debug patches overlap, the debug patch that is activated last will have precedence. This command can support activating debug patches to replace system classes (e.g., WLS classes and other classes on the system classpath), as well as classes in deployed applications. While activating patches this command can attempt to replace currently loaded classes.

In accordance with an embodiment, the parameters for an activate debug patch command can include: Patch, Target (Optional), PartitionName (Optional), Application (Optional), Module (Optional). The Patch parameter can designate the debug patch to be activated. The Target (Optional) parameter can be a comma separated list of servers and/or clusters where the debug patch can be activated. The PartitionName parameter can designate a partition, or partitions, in which scope the debug patch can be activated. The Application (Optional) parameter can designate an application in which scope the debug patch can be activated. If the Application parameter is not specified, the debug patch can be applied to system classes. The Module parameter can limit, when an Application parameter is specified, a scope of activation to a specific module, or modules, within the application(s) specified in the Application parameter.

The result of an activate debug patch command can, in accordance with an embodiment, return a task, or an array of tasks, to monitor a progress of the debug patch activation. Log messages can be logged in indicate start and completion (successful or failure) of the task. What follows are examples activate debug patch commands:

```
# Connected to admin server: Activate debug-patch-01.jar on managed
# servers MS1 and MS2
task=activateDebugPatch(Patch='debug-patch-01.jar', Target='MS1,MS2')
# Connected to admin server: Activate debug-patch-01.jar on myserver and
# all members of cluster Cluster-0
task=activateDebugPatch(Patch='debug-patch-01.jar', Target='myserver,
Cluster-0')
# Connected to MS1: Activate debug-patch-01.jar on MS1
task=activateDebugPatch(Patch='debug-patch-01.jar')
# Connected to admin server: Activate debug-patch-03.jar on application
# 'medrec' targeted to cluster Cluster-1
task=activateDebugPatch(Patch='debug-patch-03.jar', Target='Cluster-1',
Application='medrec')
# Connected to admin server: Activate debug-patch-03.jar on module 'ejb1'
# in application 'medrec' targeted to cluster Cluster-1
task=activateDebugPatch(Patch='debug-patch-03.jar', Target='Cluster-1',
Application='medrec', Module='ejb1')
```

Deactivate Debug Patch Command

In some embodiments, a deactivate debug patch command, such as deactivateDebugPatches, can deactivate a list, such as a comma separated list, of debug patches on specified targets. In situations where a specified debug patch is not already active on a target, a warning can be issued and the command will continue. After successful deactivation on a target, the target can be left in a state as if the remaining patches were activated in the order in which they were originally activated. If patches are not specified at all in the command, all active patches can be de-activated and original classes can be made active on the specified targets.

In accordance with an embodiment, the parameters for a deactivate debug patch command can include: Patches (Optional), Target (Optional), PartitionName (Optional), Application (Optional), Module (Optional). The Patches parameter can designate the debug patchs to be deactivated. In situations where the Patches parameter is not defined, all active debug patches can be deactivated on the specified targets. The Target (Optional) parameter can be a comma separated list of servers and/or clusters where the debug patch can be deactivated. The PartitionName parameter can designate a partition, or partitions, in which scope the debug patch can be deactivated. The Application (Optional) parameter can designate an application in which scope the debug patch can be deactivated. If the Application parameter is not specified, the debug patch can be deactivated at a system level. The Module parameter can limit, when an Application parameter is specified, a scope of deactivation to a specific module, or modules, within the application(s) specified in the Application parameter.

The result of a deactivate debug patch command can, in accordance with an embodiment, return a task, or an array of tasks, to monitor a progress of the debug patch deactivation. Log messages can be logged in indicate start and completion (successful or failure) of the task. What follows are examples of deactivate debug patch commands:

```
# Connected to admin server: de-activate debug-patch-01.jar
# and debug-patch-02.jar on all members of cluster Cluster-0
task=deactivateDebugPatches(Patches='debug-patch-01.jar,debug-patch-
02.jar', Target='Cluster-0')
# Connected to admin server: de-activate all patches on the admin server
task=deactivateDebugPatches( )
# Connected to MS1: deactivate debug-patch-01.jar
task=deactivateDebugPatches(Patches='debug-patch-01.jar')
# Connected to admin server: de-activate debug-patch-03.jar on
# application 'medrec' targeted to cluster Cluster-1
task=deactivateDebugPatches(Patches='debug-patch-03.jar',
Target='Cluster-1', Application='medrec')
# Connected to admin server: de-activate debug-patch-03.jar on module
# 'ejb1' in application 'medrec' targeted to cluster Cluster-1
task=deactivateDebugPatches(Patches='debug-patch-03.jar',
Target='Cluster-1', Application='medrec', Module='ejb1')
```

Debug Patch Helper API

In accordance with an embodiment, debug code may need to maintain state. However, JDK hot-swap functionality does not allow adding new fields to classes which could be useful. To work around this limitation, a Debug Patch Helper static API can be provided which can allow creation of useful objects which may maintain state and may be referenced from debug code added in method bodies. For example, for frequently called methods, it can be desirable to accumulate results and only print them after number of invocations. In certain situations, elapsed times may be needed where the start and end points may be in different methods or classes. This API can provide utility methods for creating and destroying objects of certain useful types. Objects created with this API can be keyed with a specified {name, owner} tuple. The name can be a String identifier, and owner can be an Object reference. The {name, owner} tuple can provide flexibility for maintaining states in different scenarios. For example, the tuple can allow for creating different state objects for different connection instances being used from different applications. The API can serve as a global repository of such "named" objects. Here are some examples of the types of objects that may be created with the debug patch helper API: AtomicInteger (can be used as counters for decimation), AtomicLong (counters, timestamps), StringBuffer (accumulating buffers), Map (concurrent has map objects), and List (synchronized list objects).

The present invention may be conveniently implemented using one or more conventional general purpose or specialized digital computer, computing device, machine, or microprocessor, including one or more processors, memory and/or computer readable storage media programmed according to the teachings of the present disclosure. Appropriate software coding can readily be prepared by skilled programmers based on the teachings of the present disclosure, as will be apparent to those skilled in the software art.

In some embodiments, the present invention includes a computer program product which is a non-transitory storage medium or computer readable medium (media) having instructions stored thereon/in which can be used to program a computer to perform any of the processes of the present invention. The storage medium can include, but is not limited to, any type of disk including floppy disks, optical discs, DVD, CD-ROMs, microdrive, and magneto-optical disks, ROMs, RAMs, EPROMs, EEPROMs, DRAMs, VRAMs, flash memory devices, magnetic or optical cards, nanosystems (including molecular memory ICs), or any type of media or device suitable for storing instructions and/or data.

The foregoing description of the present invention has been provided for the purposes of illustration and description. It is not intended to be exhaustive or to limit the invention to the precise forms disclosed. Many modifications and variations will be apparent to the practitioner skilled in the art. The embodiments were chosen and described in order to best explain the principles of the invention and its practical application, thereby enabling others skilled in the art to understand the invention for various embodiments and with various modifications that are suited to the particular use contemplated. It is intended that the scope of the invention be defined by the following claims and their equivalents.

What is claimed is:

1. A system for dynamic debugging in an application server environment, comprising:

one or more computers, including an application server that enables deployment and execution of software applications, wherein the application server is associated with a domain configuration that is used at runtime to define a domain for execution of the software applications, a plurality of partitions, and one or more running managed servers;

wherein each of the plurality of partitions is associated with a partition configuration, and wherein each partition provides a subdivision of the domain and includes one or more resource groups, wherein the one or more resource groups are defined by one or more resource group templates, and wherein each of the one or more running managed servers run in the domain, and a debug framework, the debug framework comprising a debug patch directory, the debug patch directory containing a plurality of debug patches, each of the plurality of debug patches comprising at least one instrumented class;

wherein the system is configured to, upon an indication of a problem within the domain, activate a selected one of the plurality of debug patches within the domain, the selected one of the plurality of debug patches comprising at least one instrumented class, wherein the selected one of the plurality of debug patches extracts a first set of diagnostic information about the problem within the domain;

wherein the selected one of the plurality of debug patches logs the extracted first set of diagnostic information about the problem in a debug log;

wherein upon activation of the selected one of the plurality of debug patches within the domain, the one or more running managed servers remain running; and wherein activation of the selected one of the plurality of debug patches within the domain comprises replacing at least one class within the domain with the at least one instrumented classes of the selected one of the plurality of debug patches.

2. The system of claim 1, wherein the at least one instrumented class of the debug patch has a same shape as the at least one class within the domain.

3. The system of claim 1, wherein upon logging the first set of diagnostic information in the debug log, a new debug patch is designed based upon the first set of diagnostic information, the new debug patch designed to extract a second set of diagnostic information;

wherein the selected one of the plurality of debug patches is deactivated; and wherein the new debug patch, the new debug patch comprising at least one instrumented class, is activated within the domain, wherein the new debug patch extracts the second set of diagnostic information about the problem within the domain.

4. The system of claim 2, wherein the system is further configured to, after activation of the selected one of the plurality of debug patches within the domain, deactivate the selected one of the plurality of debug patches without restarting the one or more running managed servers.

5. The system of claim 1, wherein the application server environment comprises a multi-tenant application server environment, and wherein the system further comprises one or more partitions, wherein each partition provides an administrative and runtime subdivision of the domain, that can be associated with a tenant.

6. The system of claim 5, wherein the activated selected one of the plurality of debug patches within the domain is scoped to a partition of the one or more partitions.

7. The system of claim 6, wherein the system is further configured to, after activation of the scoped selected one of the plurality of debug patches within the domain, deactivate the scoped selected one of the plurality of debug patches without restarting the one or more running managed servers.

8. A method for dynamic debugging in an application server environment, comprising:

providing, at one or more computers, including an application server that enables deployment and execution of software applications, wherein the application server is associated with a domain configuration that is used at runtime to define a domain for execution of the software applications, a plurality of partitions, and one or more running managed servers, wherein each of the plurality of partitions is associated with a partition configuration, and wherein each partition provides a subdivision of the domain and includes one or more resource groups, wherein the one or more resource groups are defined by one or more resource group templates, wherein each of the one or more running managed servers run in the domain, and a debug framework, the debug framework comprising a debug patch directory, the debug patch directory containing a plurality of debug patches, each of the plurality of debug patches comprising at least one instrumented class;

activating, upon an indication of a problem within the domain, a selected one of the plurality of debug patches within the domain, the selected one of the plurality of debug patches comprising at least one instrumented class, wherein the selected one of the plurality of debug patches extracts a first set of diagnostic information about the problem within the domain;

logging, by the selected one of the plurality of debug patches, the extracted diagnostic information about the problem in a debug log;

wherein upon activation of the selected one of the plurality of debug patches within the domain, the one or more running managed servers remain running; and wherein activation of the selected one of the plurality of debug patches within the domain comprises replacing at least one class within the domain with the at least one instrumented classes of the selected one of the plurality of debug patches.

9. The method of claim 8, wherein the at least one instrumented class of the debug patch has a same shape as the at least one class within the domain.

10. The method of claim 8, further comprising:

upon logging the first set of diagnostic information in the debug log, designing a new debug patch based upon the first set of diagnostic information, the new debug patch designed to extract a second set of diagnostic information;

deactivating the selected one of the plurality of debug patches; and activating the new debug patch, the new debug patch comprising at least one instrumented class, within the domain, wherein the new debug patch extracts the second set of diagnostic information about the problem within the domain.

11. The method of claim 9, further comprising:

after activating the selected one of the plurality of debug patches within the domain, deactivating the selected one of the plurality of debug patches within the domain without restarting the one or more running managed servers.

12. The method of claim 8, wherein the application server environment comprises a multi-tenant application server environment, wherein each of the plurality of partitions are associated with a tenant of a plurality of tenants.

13. The method of claim 12, wherein the activated selected one of the plurality of debug patches within the domain is scoped to a partition of the one or more partitions.

14. The method of claim 13, further comprising:

after activating the scoped selected one of the plurality of debug patches within the domain, deactivating the scoped selected one of the plurality of debug patches within the domain without restarting the one or more running managed servers.

15. A non-transitory computer readable storage medium, including instructions stored thereon for dynamic debugging in an application server environment which when read and executed by one or more computers cause the one or more computers to perform steps comprising:

providing, at one or more computers, including an application server that enables deployment and execution of software applications, wherein the application server is associated with a domain configuration that is used at runtime to define a domain for execution of the software applications, a plurality of partitions, and one or more running managed servers, wherein each of the plurality of partitions is associated with a partition configuration, and wherein each partition provides a subdivision of the domain and includes one or more resource groups, wherein the one or more resource groups are defined by one or more resource group templates, wherein each of the one or more running managed servers run in the domain, and a debug framework, the debug framework comprising a debug patch directory, the debug patch directory containing a plurality of debug patches, each of the plurality of debug patches comprising at least one instrumented class;

activating, upon an indication of a problem within the domain, a selected one of the plurality of debug patches within the domain, the selected one of the plurality of debug patches comprising at least one instrumented class, wherein the selected one of the plurality of debug patches extracts a first set of diagnostic information about the problem within the domain;

logging, by the selected one of the plurality of debug patches, the extracted diagnostic information about the problem in a debug log;

wherein upon activation of the selected one of the plurality of debug patches within the domain, the one or more running managed servers remain running; and wherein activation of the selected one of the plurality of debug patches within the domain comprises replacing at least one class within the domain with the at least one instrumented classes of the selected one of the plurality of debug patches.

16. The non-transitory computer readable storage medium of claim 15, wherein the at least one instrumented class of the debug patch has a same shape as the at least one class within the domain.

17. The non-transitory computer readable storage medium of claim 15, the steps further comprising:

upon logging the first set of diagnostic information in the debug log, designing a new debug patch based upon the first set of diagnostic information, the new debug patch designed to extract a second set of diagnostic information;

deactivating the selected one of the plurality of debug patches; and activating the new debug patch, the new debug patch comprising at least one instrumented class, within the domain, wherein the new debug patch extracts the second set of diagnostic information about the problem within the domain.

18. The non-transitory computer readable storage medium of claim 15, the steps further comprising:

after activating the selected one of the plurality of debug patches within the domain, deactivating the selected one of the plurality of debug patches within the domain without restarting the one or more running managed servers.

19. The non-transitory computer readable storage medium of claim 16, wherein the application server environment comprises a multi-tenant application server environment, the steps comprising:

providing one or more partitions, wherein each partition provides an administrative and runtime subdivision of the domain, that can be associated with a tenant.

20. The non-transitory computer readable storage medium of claim 19, wherein the activated selected one of the plurality of debug patches within the domain is scoped to a partition of the one or more partitions.

* * * * *

UNITED STATES PATENT AND TRADEMARK OFFICE

CERTIFICATE OF CORRECTION

PATENT NO. : 9,971,671 B2
APPLICATION NO. : 14/860348
DATED : May 15, 2018
INVENTOR(S) : Inamdar et al.

It is certified that error appears in the above-identified patent and that said Letters Patent is hereby corrected as shown below:

On the Title Page

In Column 1, under item Notice, Line 3, after "0 days." delete "days.".

In the Specification

In Column 1, Line 29, delete "copyrights" and insert -- copyright --, therefor.

Signed and Sealed this
Thirtieth Day of October, 2018

Andrei Iancu
*Director of the United States Patent and Trademark Office*